United States Patent
Pai et al.

(10) Patent No.: US 8,895,928 B2
(45) Date of Patent: Nov. 25, 2014

(54) COMPENSATED OPTICAL DETECTION APPARATUS, SYSTEMS, AND METHODS

(75) Inventors: Raj Pai, Houston, TX (US); Marian Morys, Downingtown, PA (US); Phap Hung Lien, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 172 days.

(21) Appl. No.: 13/576,318

(22) PCT Filed: Feb. 3, 2011

(86) PCT No.: PCT/US2011/023607
§ 371 (c)(1),
(2), (4) Date: Jul. 31, 2012

(87) PCT Pub. No.: WO2011/097382
PCT Pub. Date: Aug. 11, 2011

(65) Prior Publication Data
US 2012/0298851 A1 Nov. 29, 2012

Related U.S. Application Data

(60) Provisional application No. 61/301,787, filed on Feb. 5, 2010.

(51) Int. Cl.
*G01J 5/14* (2006.01)
*E21B 47/10* (2012.01)

(52) U.S. Cl.
CPC *G01J 5/14* (2013.01); *E21B 47/102* (2013.01)
USPC ............................ 250/339.02; 250/262

(58) Field of Classification Search
USPC ............. 250/253, 262, 338.1, 339.01, 339.02
See application file for complete search history.

(56) References Cited

U.S. PATENT DOCUMENTS

| | | |
|---|---|---|
| 5,023,450 A | 6/1991 | Gold |
| 5,162,658 A | 11/1992 | Turner et al. |
| 5,668,539 A | 9/1997 | Patchell |
| 6,583,416 B1 | 6/2003 | Villani |
| 2002/0126002 A1 | 9/2002 | Patchell |
| 2003/0025639 A1 | 2/2003 | Rodney et al. |
| 2007/0241260 A1 | 10/2007 | Jaeger et al. |
| 2008/0021674 A1 | 1/2008 | Puskas |
| 2009/0244536 A1 | 10/2009 | Mitchell et al. |

FOREIGN PATENT DOCUMENTS

WO WO-2011097382 A1 8/2011

OTHER PUBLICATIONS

"Australian Application Serial No. 2011212886, Examination Report mailed Jan. 22, 2013", 3 pgs.
"Australian Application Serial No. 2011212886, Response filed Sep. 5, 2013 to Examination Report mailed Jan. 22, 2013", 11 pgs.

(Continued)

*Primary Examiner* — Mark R Gaworecki
(74) *Attorney, Agent, or Firm* — Schwegman Lundberg & Woessner, P.A.; Benjamin Fite

(57) ABSTRACT

In some embodiments, apparatus and systems, as well as methods, may operate to receive radiation at an active detector of a pair of radiation detectors to provide a first signal proportional to an intensity of the radiation, to receive none of the radiation at a blind detector of the pair of radiation detectors to provide a second signal proportional to the reception of no radiation, and to combine the first signal and the second signal to provide an output signal representing the difference between the first signal and the second signal. The pair of radiation detectors may comprise thermopile detectors. Combination may occur via differential amplification. Additional apparatus, systems, and methods are disclosed.

20 Claims, 8 Drawing Sheets

(56) References Cited

OTHER PUBLICATIONS

"European Application Serial No. 11740356.8, Amended Claims filed Aug. 14, 2012", 5 pgs.
"Mexican Application Serial No. MX/a/2012/008828, Office Action mailed Jun. 14, 2013", (English Summary), 1 pg.
"Mexican Application Serial No. MX/a/2012/008828, Response filed Aug. 27, 2013 to Office Action mailed Jun. 14, 2013", (w/ English Translation of Claims), 22 pgs.
"Internatinal Application Serial No. PCT/US11/023607, Search Report mailed Apr. 1, 2011", 5 pgs.
International Application Serial No. PCT/US11/023607, Written opinion mailed Apr. 1, 2011", 12 pgs.
"International Application Serial No. PCT/US2011/023607, International Preliminary Report on Patentability mailed Feb. 22, 2012", 17 pgs.
"Australian Application Serial No. 2014200023, Amendment filed Mar. 31, 2014", 4 pgs.
Australian Application Serial No. 2014200023, First Examiner Report mailed Jul. 3, 2014, 13 pgs.
"International Application Serial No. PCT/US11/023607, Response filed Oct. 11, 2011 to Written Opinion mailed Apr. 1, 2011", 7 pgs.

Technical Specifications

Specifications apply at 23°C with KBr Window and Nitrogen encapsulating gas

| Parameter | Min | Typical | Max | Symbol | Units | Comments |
|---|---|---|---|---|---|---|
| Active Area Size | | 1.2 x 1.2 | | AA | mm | Hot junction size, per element. |
| Element Area | | 1.44 | | A | $mm^2$ | |
| Number of Junctions | | 80 | | | | Per element. |
| Number of Channels | | 2 | | | | Per detector package. |
| Output Voltage | | 165 | | $V_S$ | μV | DC, H=330μW/$cm^2$(3) |
| Signal-to-Noise Ratio | | 4,301 | | SNR | √Hz | DC, SNR = $V_S/V_n$ |
| Responsivity | | 34.7 | | R | V/W | DC, $R = V_S/HA$ (2) |
| Resistance | | 90 | | R | kΩ | Detector element |
| Temperature Coefficient of R | | -.04 | | | %/°C | Best linear fit, 0° to 85°C(1) |
| Temperature Coefficient of R | | .02 | | | %/°C | Best fit, 0° to 85°C(1) |
| Noise Voltage | | 38.4 | | $V_n$ | nV/√Hz | $V_n^2 = 4kTR$ |
| Noise Equivalent Power | | 1.10 | | NEP | nW/√Hz | DC, NEP = $V_n$ HA/$V_a$(2) |
| Detectivity | | 1.09 | | D* | $10^8$cm√Hz/W | DC, $D^* = V_S/V_n$ H√A (2) |
| Time Constant | | 25 | | $T$ | ms | Chopped, -3dB point (1) |
| Field of View | | 27°/77° | | FOV | Degrees | See Assembly Drawings for FOV Description. |
| Package Type | | TO-5 | | | | Standard package hole size: $.090^2 \times .090^2$ |
| Element Matching | | 25 | | M | % | $M = |V_A - V_B|/V_B$(2) |
| Element Separation | | 3.30 | | | mm | Center to Center |
| Operating Temperature | -50 | | 125 | $T_a$ | °C | |

General Specifications: Flat spectral response from 100nm to > 100μm. Linear signal output from $10^{-6}$ to 0.1W/$cm^2$. Maximum incident radiance 0.1W/$cm^2$, damage threshold[3] .5W/$cm^2$ Notes: (1) Parameter is not 100% tested. 90% of all units meet these specifications. (2) A is detector area in $cm^2$.
(3) Test Conditions: 500K Blackbody source; Detector active surface 10cm from 0.6513cm Diameter Blackbody Aperture.

FIG. 2

COMPENSATED OPTICAL DETECTION APPARATUS, SYSTEMS, AND METHODS

RELATED APPLICATIONS

This application is a U.S. National Stage Filing under 35 U,S.C. 371 from International Application No. PCT/US2011/023607, filed on Feb. 3, 2011, and published as WO 2011/097382 A1 on Aug. 11, 2011; which application claims the benefit of priority to U.S. Provisional Patent Application Ser. No. 61/301,787, filed on Feb. 5, 2010, which applications and publication are incorporated herein by reference in their entirety.

BACKGROUND

Capturing downhole fluid samples often occurs during Wireline and Logging While Drilling/Measurement While Drilling (LWD/MWD) formation exploration. These samples may be used to determine the quality and properties of formation fluid. During drilling, fluid filtrate invades the formation and contaminates fluids near the well bore. To reduce the level of contamination (e.g., to where the level of fluid contamination remains at or below 5%) during sample acquisition, a considerable length of time may be spent pumping the formation. Thus, field operators are interested to know when the contamination has been reduced to an acceptable level, so that representative samples may be taken.

BRIEF DESCRIPTION OF THE DRAWINGS

FIG. 2 is a table listing technical specifications for an embodiment of the dual-detector of FIG. 1, according to various embodiments of the invention.

DETAILED DESCRIPTION

One technique that may be used to determine sampled fluid properties is that of evaluating the optical properties of a sample. The optical properties of a fluid sample can in turn be used to determine the level of contamination, fluid type, fluid composition, and pressure, volume, temperature (PVT) properties. In some embodiments, the technique involves directing visible, near infra-red (IR), and mid-IR radiation through a fluid sample so that the properties of the radiation after passing through the fluid can be measured.

Figure 1:
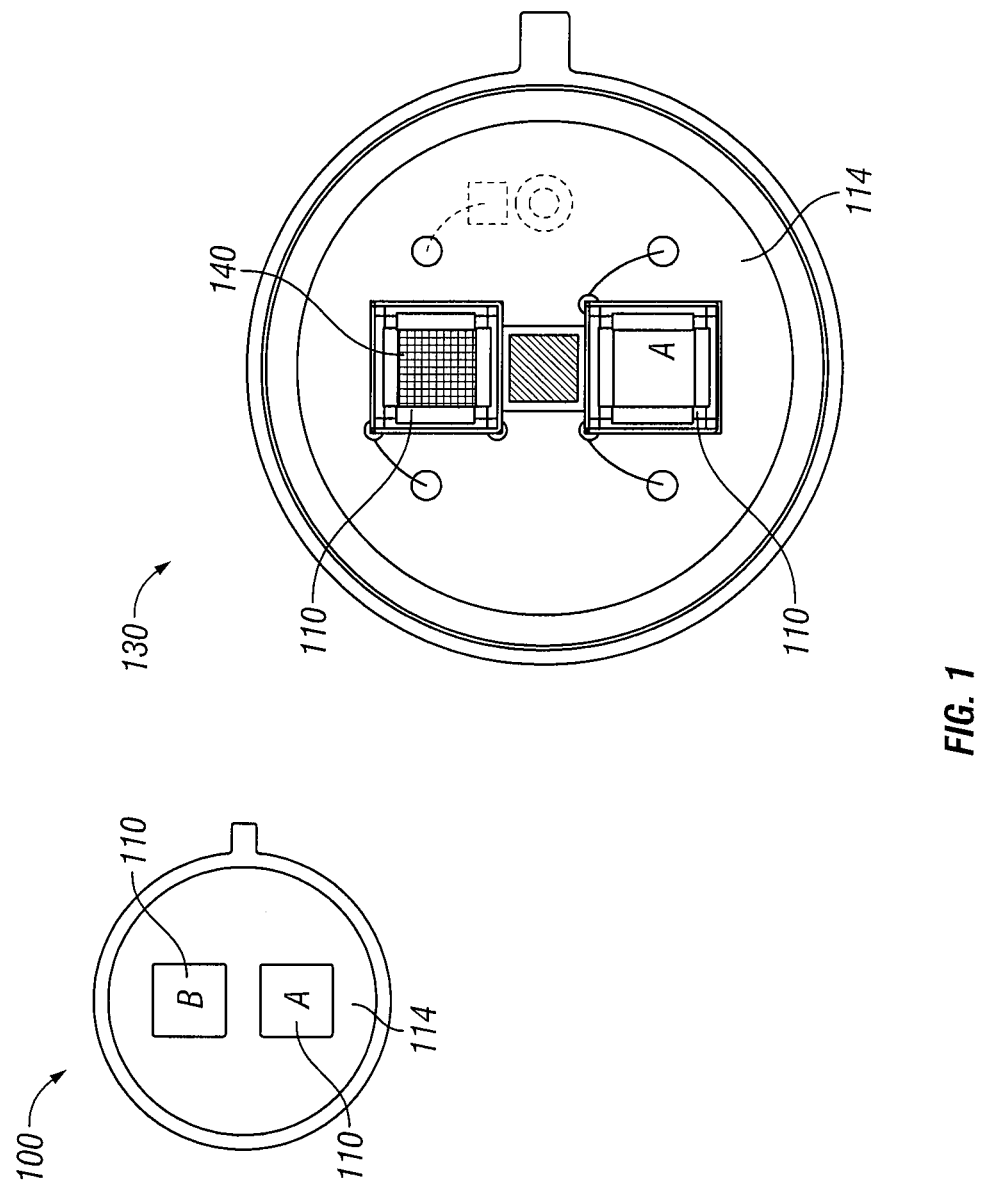
FIG. 1 illustrates two examples of the physical layout for a dual-detector according to various embodiments of the invention.

FIG. 1 illustrates two examples of the physical layout for a dual-detector 100, 130 according to various embodiments of the invention. In many embodiments, the range of wavelengths to be detected is from about 300 nm to about 5000 nm. In various embodiments, a single detection scheme (e.g., using a single dual-detector 100, 130) is capable of detecting the entire range of wavelengths over the entire range of expected downhole temperatures (e.g., 0 C to 200 C). For example, two detectors 110 (e.g., thermopile detectors) can be assembled on one substrate 114 and used with a differential amplifier (see FIG. 3) as a preamplifier to dynamically compensate for ambient temperature variations.

FIG. 2 is a table 200 listing technical specifications for an embodiment of the dual-detector of FIG. 1, according to various embodiments of the invention. Optical detector technologies that are usable in the downhole environment for various embodiments of the dual-detector include silicon photodetectors, InGaAs detectors, thermopile detectors, and pyroelectric detectors, among others. The specifications in table 200 apply to a Dexter Research Center, Inc. (of Dexter, Mich., U.S.A.) ST120 dual silicon-based thermopile detector. When activated by light, these detectors produce electrical voltage or current signals, depending on the type of detector used. Signals from the detector can be processed by a preamplifier circuit before presentation to a data acquisition system.

The wide temperature range of the downhole operations poses some challenges. A thermopile dual-detector arrangement can be used to meet these challenges in many cases. Of course, other optical energy detectors that respond over a range of about 300 nm to about 5000 nm, such as quantum detectors (e.g., photo-diode), may also be used. Thermopile detectors have a useful high bandwidth (wide range), but they are sometimes overwhelmed by in-band noise.

Referring now to FIGS. 1 and 2, it can be seen that some embodiments of the dual-detector 100, 130 make use of two substantially identical detectors 110, such as thermopile detectors, in close proximity, such as being attached to the same substrate or other support surface.

In most embodiments, one of the detectors is a "blind detector". For example, in FIG. 1, detector B may comprise a blind detector. In the case of the dual-detector 100, detector B is blinded by refraining from directing any of the incident radiation to it. That is, while detector A is positioned to receive incident radiation (e.g., after passing through a fluid sample) as an active detector, detector B is not permitted to receive the same radiation. This may be accomplished by exposing detector A, for example, while detector B is permanently covered, or at least shuttered for the time detector A is exposed to the radiation. Another embodiment may use an optical fiber to direct radiation to detector A, but not to detector B.

In the case of the dual-detector 130, incident radiation is blocked from detector B. If detector B is always covered by a cover 140, then detector B comprises a permanently blind detector 110. This may be accomplished by placing a cover 140 over detector B that comprises any kind of radiation-tight enclosure that always prevents radiation applied to detector A from reaching detector B. However, if the cover 140 comprises a shutter, so that detector B may be selectively exposed to the incident radiation, then detector B comprises a periodically blind detector. A cover 140 comprising a shutter may also be applied to cover detector A (not shown), so that detector A also comprises a periodically blind detector.

In this way, detectors A and B may simultaneously comprise periodically blind detectors, so that each can be compared with the other. Thus, detector B can be used in comparison with detector A, by blinding detector A as the periodically blind detector, while detector B is located to receive radiation. Alternately, detector A can be used in comparison with detector B, by blinding detector B as the periodically blind detector, while detector A is located to receive radiation. Thus, individual shutters may be used to expose detectors A or B to the incident radiation, in an alternating fashion. The source of radiation may also be self-shuttered.

In either case, the two detectors 110 that form a dual-detector pair may be connected to a preamplifier (e.g., in the form of a differential/instrumentation amplifier) such that their output signals are used to cancel each other. When this occurs, the output of the amplifier (e.g., preamplifier) will be substantially zero when the incident radiation is blocked from the non-blind detector (e.g., using a shutter device).

When it is time to measure radiation that passes through a sample, the dual-detector 100 can be operated by opening a shutter over detector A for a time period that is sufficient for the output signal from detector A to reach a substantially steady state, which is usually about 2-10 times the response time of the detector, or on the order of about 1-500 msec, depending on the detector used. The difference between the initial signal value (prior to opening the shutter) and the final signal value taken from the amplifier can be used to represent the optical power measurement. Essentially, the amplifier is used to subtract the background radiation of a black body from the incident radiation when one of the detectors 110 (e.g., detector B) is blind, while the other (e.g., detector A) is exposed to the radiation.

Figure 3:
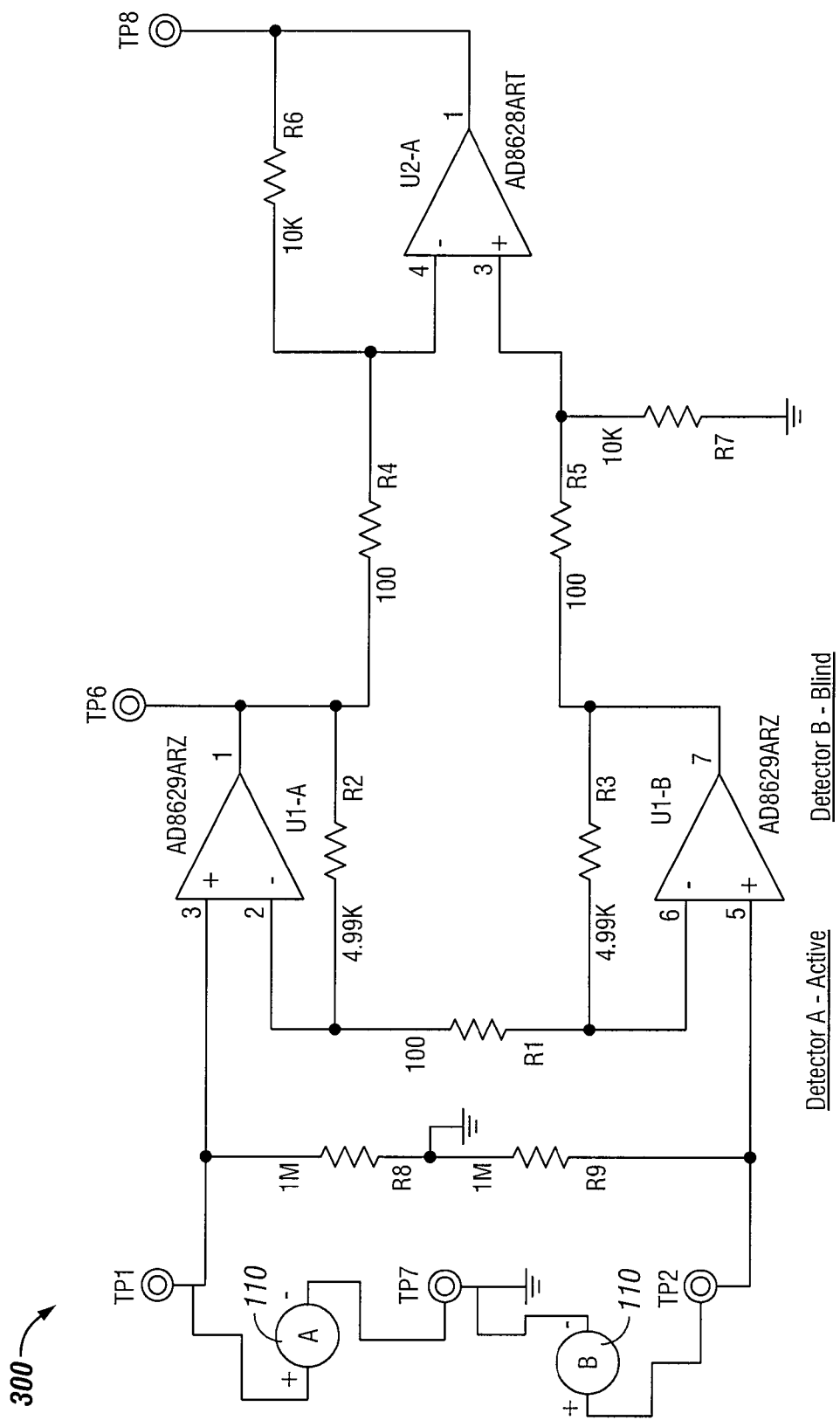
FIG. 3 is a schematic diagram of a circuit that can be used with the dual-detector of FIG. 1, according to various embodiments of the invention.

FIG. 3 is a schematic diagram of a circuit 300 that can be used with the dual-detector of FIG. 1, according to various embodiments of the invention. Here detector A is exposed, while detector B is blind. For example, if the ST120 detector is used as a dual-detector in some embodiments, detector B of the detector pair can be kept in the dark by closing its window with a metal cover. When there is no light, both detectors 110 have the same output and the resulting differential amplifier output signal TP8 is zero.

If the detectors 110 are proximate to each other, or mounted to the same supporting surface, such as the same substrate, this can result in the detectors 110 performing as a substantially matched pair over temperature. A mismatch in output characteristics appears at the output as an offset voltage output signal TP8. However, this offset voltage is typically much less than that of a single detector output with variations due to changes in the ambient temperature.

When the exposed detector (e.g., detector A) is irradiated, it will produce a signal TP1 which is amplified by the differential amplifier U2-A. Since the resulting output signal TP8 is mostly devoid of temperature-based offset (e.g., when the reference sensor detector B and the active sensor detector A are subject to substantially the same variations in temperature—especially when they are attached to the same substrate), it is possible to employ much larger gains in the amplifier circuit 300. That is, a roughly 20 to 50 fold increase in overall amplifier gain may be employed when using a dual-detector combination that uses a blind reference substantially matched to the active detector with respect to ambient temperature. This relatively high gain permits detecting incident radiation with higher accuracy and resolution, especially above 2500 nm. Thus, the gain of the circuit 300 can be varied dynamically without the effects that would otherwise prevent large changes due to temperature mismatch. For example, in FIG. 3, resistor R1 can be changed to increase or reduce the gain of the difference signal of the combination of amplifiers U1A and U1B. This can be implemented using an automatic gain control (AGC), with resistor R1 being a variable resistor in some embodiments.

Performance can sometimes be improved by using alternating blind detectors. In this case, both detectors 110 have shutters or some other mechanism that alternately directs radiation to one (e.g., detector A) and then the other (e.g., detector B). While one of the detectors is active, and open to receive the radiation, the other is blind to the radiation (i.e, periodically blind). In some embodiments, the radiation is shuttered at the source, to be directed to one detector, and then the other. A rotating mirror or other bi-directional optical device can be used to direct the radiation. This embodiment may operate to double the effective signal-to-noise ratio (SNR) over the non-alternating operational scenario, because twice the signal (differentially) is obtained, with the same noise. For example, if +1V is provided by one detector (when it is irradiated), and −1V is provided by the other detector (when it is irradiated)—the differential combination gives +2V of output signal TP8 amplitude, with the same noise that would be present if only one detector is used as an active sensor.

Figure 4:
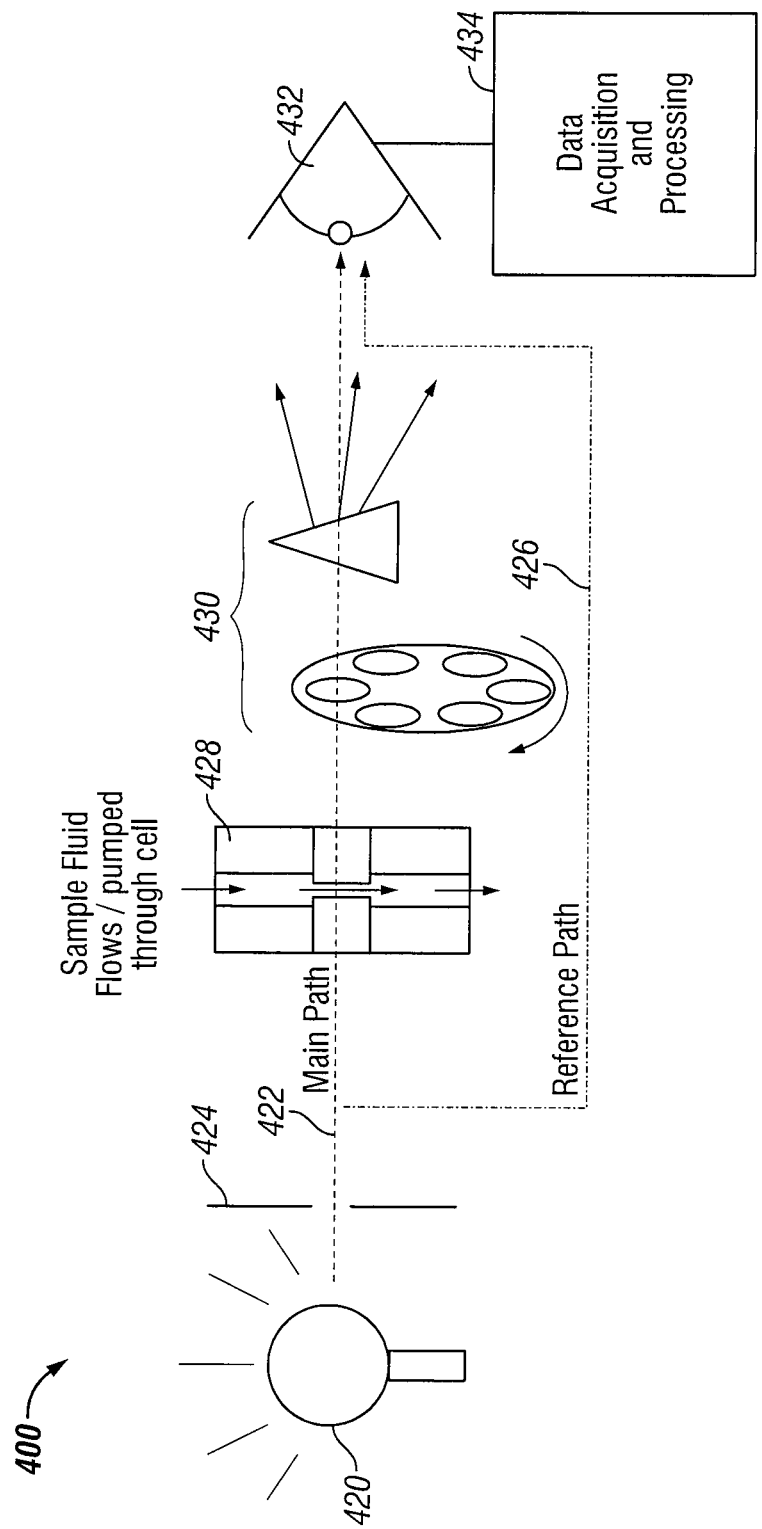
FIG. 4 is a block diagram of an optical detection apparatus according to various embodiments of the invention.

FIG. 4 is a block diagram of an optical detection apparatus 400 according to various embodiments of the invention. In some embodiments, the apparatus 400 forms part of a complete spectroscopy system.

The source 420 of radiation may comprise a relatively broadband source, such as one that radiates over a range of about 0.3 um to about 6 um. The source 420 may be a single source, or comprise multiple sources, perhaps radiating over different wavelength bands. For example, the source 420 may comprise a tungsten filament.

A collimator 424 may be used in conjunction with the source 420 to direct the main path radiation 422 along the main path until it reaches the active detector of the detector-amplifier 432. The collimator 424 may include a variety of optics in some embodiments, including parabolic reflectors, lenses, minors, etc. The collimator 424 may be used anywhere along the main path to improve transmission efficiency.

The radiation from the source 420 may also be directed along the reference path as reference radiation 426, to the active detector contained in the detector-amplifier 432. In some embodiments, the reference radiation 426 may provide a useful comparison with the signal obtained via the main path radiation 422.

In some embodiments, the apparatus 400 comprises a flow cell 428. In many cases, high pressure, high temperature sample fluid flows through the cell 428. The radiation from the source 420 passes through an optically transparent primary window in the cell 428, though the fluid, and then out of a secondary window. The fluid interacts with the radiation, imprinting its radiation-sensitive properties on the spectral components of the main path radiation 422.

Sapphire or other suitable materials may be used in the windows of the cell 428 to allow broadband radiation to pass through the fluid sample. Such material is usually strong enough to withstand high pressure (e.g., up to 30 Kpsi) and high temperature (e.g., up to 260 C). The gap between primary and secondary windows can be set somewhere to a range of distances, such as between about 0.5 mm and about 3 mm. The gap may be a variable gap.

A spectral distributor 430 may be disposed to intercept the main path radiation 422. The distributor 430 may operate to separate radiation into wavelength bands in order to determine the wavelength spectral content of the fluid being measured. The mechanism of distribution may comprise a filter array, a prism, a color wheel, or an optical grating. A rotating chopper/filter wheel may be used to modulate the radiation, while providing radiation that is periodically separated into wavelength bands.

The detector-amplifier 432 may be similar to or identical to the dual-detectors 100, 130. The detector-amplifier 432 may also comprise an array of detectors (e.g., Dexter Research Center, Inc. 10 channel thin-film based thermopile detector), with blind detectors at the ends of the array, or in the middle, or both, or using alternating active and blind sensors along the length of the array. The detector-amplifier 432 may comprise amplifier circuitry similar to or identical to the circuit 300 of FIG. 3, perhaps configured to respond to radiation over a range of wavelengths, such as from about 0.3 um to about 6 um. The detector-amplifier 432 may comprise one or more types of detectors, including thermal detectors (e.g., pyroelectric, thermopile, etc.), and photodetectors (photoacoustic, silicon diode, PbSe, InGaAs, PMT, etc.).

The output signal from the detector-amplifier 432 (e.g., similar to or identical to the output signal TP8 of FIG. 3) may be conditioned, measured, and digitized by acquisition and processing electronics 434. Digitized versions of the output signal from the detector-amplifier 432 may then further processed into data that describes fluid properties (e.g., contamination, fluid type, gas-oil ratio (GOR), composition, etc.) associated with the fluid sampled in the cell 428. This data may be stored in the electronics 434 downhole, or transmitted to the surface via wireline or MWD/LWD telemetry.

Previously, a thermopile detector was not considered as a viable detector for downhole applications because of excessive offset voltage, at higher gains, that sometimes acted to completely mask the received radiation signal. Some of the embodiments described herein permit using a gain that is 25 (or more) times greater than what is practical for a single sensor (i.e., not the disclosed dual-detector, blind reference sensor) configuration. The result is the ability to accommodate a wide dynamic range in received radiation intensity, perhaps over a wide range of radiation wavelengths without using separate detector types. That is, reception of radiation over a range of about 300 nm to about 5000 nm may be achieved using the dual-detector scheme described herein. Thus, many embodiments may be realized.

For example, referring now to FIGS. 1-4, it can be seen that an apparatus 400 may comprise at least one pair of radiation detectors configured as an active detector and a permanently blind detector, or as a set of periodically-blind detectors that alternate between active and blind operation. The apparatus 400 may further comprise at least one amplifier to receive a pair of signals from the pair of detectors, and to transform the pair of signals into an output signal representing the difference between a signal proportional to radiation received by a blind one of the pair of detectors and a signal proportional to radiation received by an active one of the pair of detectors. As noted previously, the amplifier may comprise a differential amplifier, and the pair of radiation detectors may comprise thermopile detectors, among others.

In some embodiments, the pair of radiation detectors is attached to a single supporting surface, such as a substrate. In some embodiments, the apparatus 400 comprises an array of detectors (including the original pair of radiation detectors), wherein at least one additional detector in the array comprises a periodically blind detector or a permanently blind detector. In this way, an array of detectors may have multiple blind detectors that can be used to compensate selected active member detectors of the array.

In some embodiments, the apparatus 400 may comprise a source of the radiation to be received by the active one of the pair of detectors. The apparatus may also comprise a flow cell to receive a fluid sample and to permit passage of the radiation received by the active one of the pair of detectors through the fluid sample.

Figure 5:
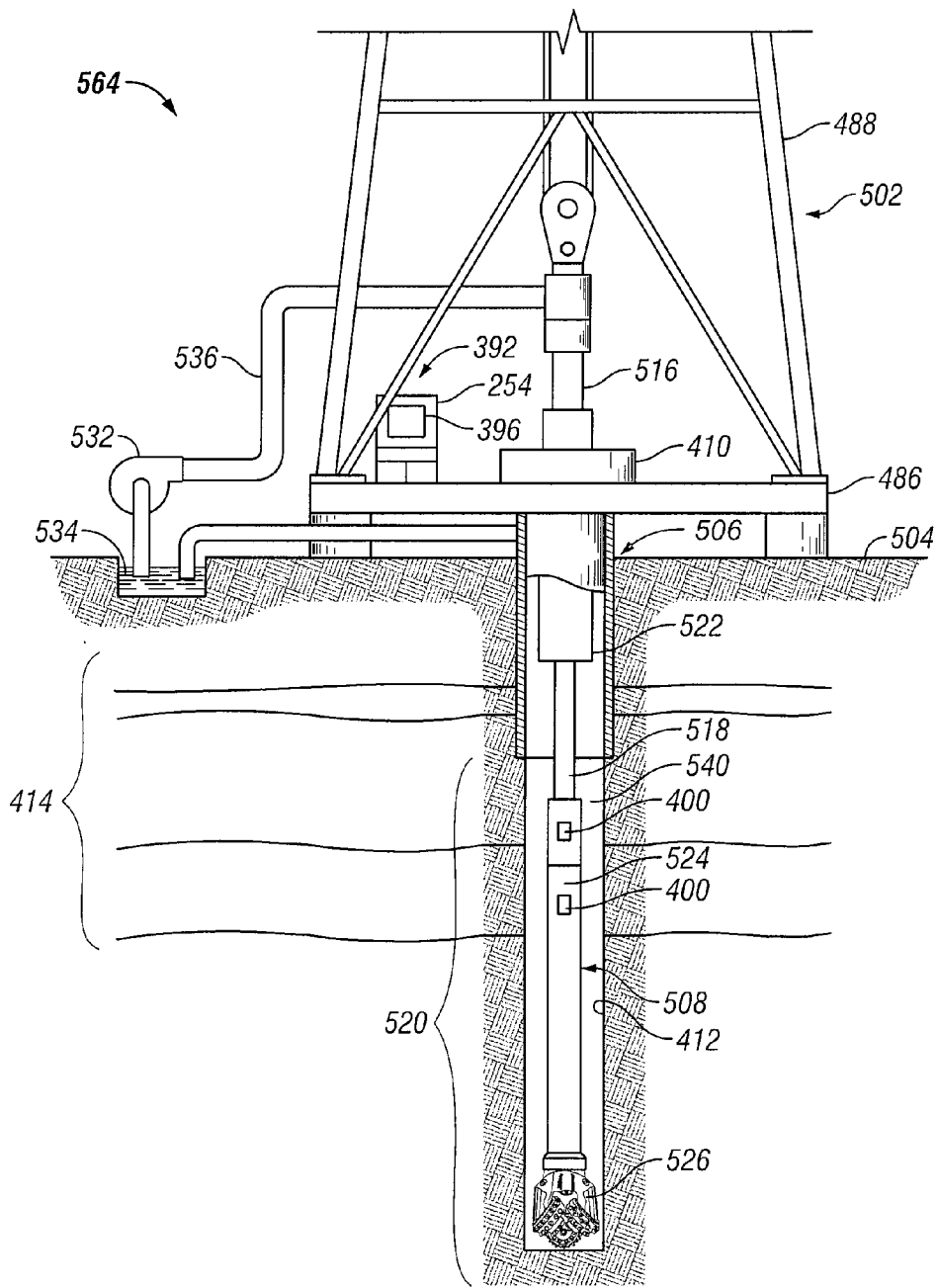
FIGS. 5-6 illustrate system embodiments of the invention.
Figure 6:
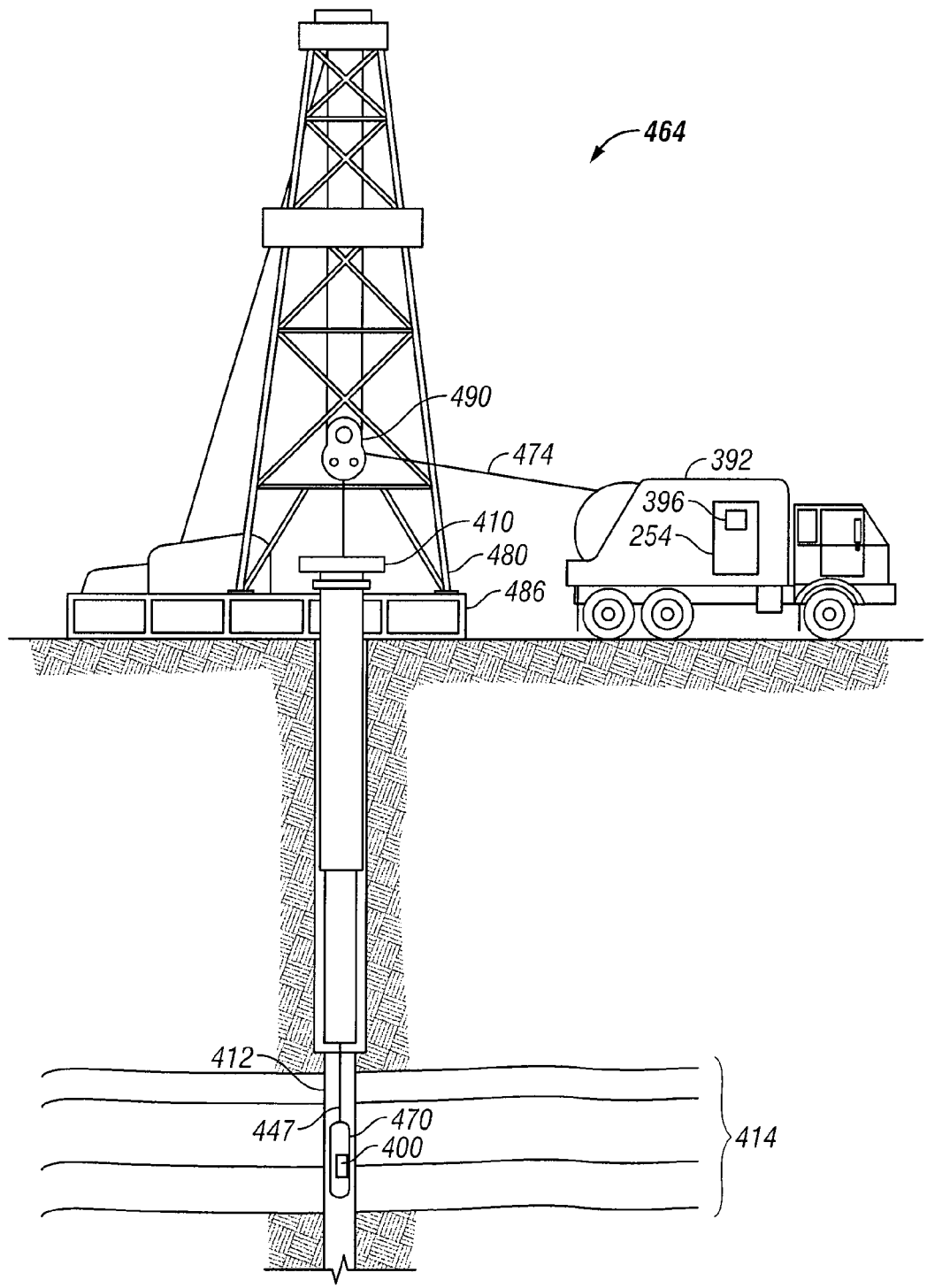

FIGS. 5-6 illustrate system embodiments of the invention. For example, FIG. 5 illustrates a drilling rig system 564 embodiment of the invention, and FIG. 6 illustrates a wireline system 464 embodiment of the invention. Thus, systems 464, 564 may comprise portions of a downhole tool, realized as a tool body 470 (e.g., as part of a wireline logging operation), or as a MWD or LWD tool 524 as part of a downhole drilling operation.

The apparatus 400, which may comprise any one or more of the components previously described, may be located downhole. The apparatus 400, including any of the sub-components previously described, may thus be at least partially housed by a downhole tool, perhaps taking the form of an MWD/LWD tool 524 or a tool body 470.

In some embodiments, some portions of the apparatus 400, including the acquisition and processing electronics 434, may be located at the surface. Other portions of the apparatus may be at least partially housed by the downhole tool. Telemetry may be used to communicate between portions located downhole, and portions located at the surface.

The acquisition and processing electronics 434 may comprise a signal processor. The signal processor may be used to receive and digitize the output signal (e.g., provided by the circuit 300 in FIG. 3) to provide a digitized output signal.

The acquisition and processing electronics 432 may comprise a telemetry transmitter to communicate values associated with the output signal from the circuit 300 to a surface logging facility, perhaps one that includes a signal processor. Thus, the surface logging facility and the acquisition and processing electronics may be used to divide the labor employed in processing the output signal of the circuit 300. The surface facility may comprise a display (see element 396 of FIGS. 5, 6) to display values associated with the output signal, such as a digitized version of the output signal of the circuit 300. Thus, many embodiments may be realized.

Drilling of oil and gas wells is commonly carried out using a string of drill pipes connected together so as to form a drilling string that is lowered through a rotary table 410 into a wellbore or borehole 412. Turning now to FIG. 5, it can be seen how a system 564 may form a portion of a drilling rig 502 located at the surface 504 of a well 506. The drilling rig 502 may provide support for a drill string 508. The drill string 508 may operate to penetrate a rotary table 410 for drilling a borehole 412 through subsurface formations 414. The drill string 508 may include a Kelly 516, drill pipe 518, and a bottom hole assembly 520, perhaps located at the lower portion of the drill pipe 518. In some embodiments, apparatus 300 may be carried as part of the drill string 508 or the tool 524.

The bottom hole assembly 520 may include drill collars 522, a tool 524, and a drill bit 526. The drill bit 526 may operate to create a borehole 412 by penetrating the surface 504 and subsurface formations 414. The tool 524 may comprise any of a number of different types of downhole tools including MWD (measurement while drilling) tools, LWD tools, and others.

During drilling operations, the drill string 508 (perhaps including the Kelly 516, the drill pipe 518, and the bottom hole assembly 520) may be rotated by the rotary table 410. In addition to, or alternatively, the bottom hole assembly 520 may also be rotated by a motor (e.g., a mud motor) that is located downhole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation 414 cuttings created by operating the drill bit 526.

FIG. 6 shows a well during wireline logging operations. A drilling platform 486 is equipped with a derrick 480 that supports a hoist 490. Here it is assumed that the drilling string has been temporarily removed from the borehole 412 to allow a wireline logging tool body 470, such as a probe or sonde that carries a sonic tool 200, to be lowered by wireline or logging cable 474 into the borehole 412. Typically, the tool body 470 is lowered to the bottom of the region of interest and subsequently pulled upward at a substantially constant speed.

During the upward trip, an apparatus 400 included in the tool body 470 may be used to perform measurements in the borehole 412 as they pass by. The measurement data can be communicated to a surface logging facility 392 for storage, processing, and analysis. The logging facility 392 may be provided with electronic equipment for various types of signal processing, which may be implemented by any one or more of the components of the apparatus 400 claimed as an apparatus or a system in the claims below, and/or shown in FIGS. 1-4. The log data is similar to that which may be gathered and analyzed during drilling operations (e.g., during logging while drilling (LWD) operations).

The dual-detectors 100, 130; detectors 110; substrate 114; cover/shutter 140; circuit 300; logging facility 392; display 396; apparatus 400; rotary table 410; boreholes 412; formation 414; source 420; collimator 424; cell 428; spectral distributor 430; detector-amplifier 432; processing electronics 434; systems 464, 564; tool body 470; drilling platform 486; derrick 480; hoist 490; logging cable 474; drilling rig 502; well 506; drill string 508; Kelly 516; drill pipe 518; bottom hole assembly 520; drill collars 522; downhole tool 524; drill bit 526; mud pump 532; mud pit 534; and hose 536 may all be characterized as "modules" herein. Such modules may include hardware circuitry, and/or a processor and/or memory circuits, software program modules and objects, and/or firmware, and combinations thereof, as desired by the architect of the circuit 300, apparatus 400 and systems 464, 564, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling operations, and thus, various embodiments are not to be so limited. The illustrations of apparatus 400 and systems 464, 564 are intended to provide a general understanding of the structure of various embodiments, and they are not intended to serve as a complete description of all the elements and features of apparatus and systems that might make use of the structures described herein.

Applications that may incorporate the novel apparatus and systems of various embodiments include a variety of electronic systems, such as televisions, cellular telephones, personal computers, workstations, radios, video players, vehicles, and location technology (e.g., GPS (Global Positioning System) location technology), signal processing for geothermal tools, and smart sensor telemetry systems, among others. Some embodiments include a number of methods.

Figure 7:
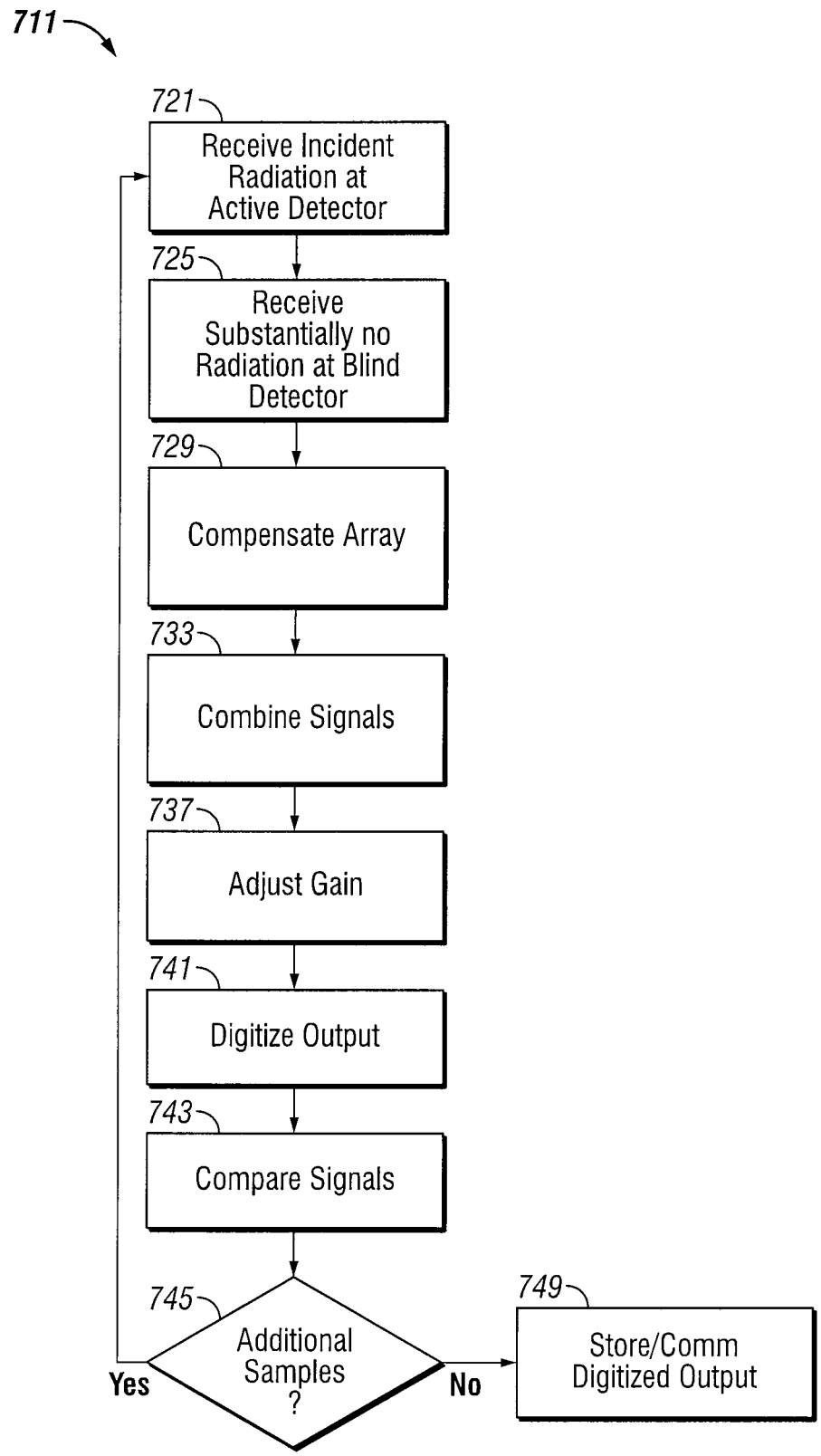
FIG. 7 is a flow chart illustrating several methods according to various embodiments of the invention.

FIG. 7 is a flow chart illustrating several methods according to various embodiments of the invention. For example, a processor-implemented method 711 to execute on one or more processors that perform methods to compensate detector pairs using combinations of active and blind detectors, may begin at block 721 with receiving incident radiation at an active detector of a pair of radiation detectors to provide a first signal proportional to an intensity of the radiation.

Receiving the incident radiation at the active detector, as part of the activity at block 721, may comprise receiving the radiation at the active detector comprising an alternately shuttered, periodically blind one of the detectors. Receiving the incident radiation at the active detector may also comprise receiving the radiation at the active detector after the radiation has passed through a flow cell. In addition, or alternatively, receiving the incident radiation at the active detector may comprise receiving the radiation at the active detector after the radiation has passed through a spectral distributor.

The method 711 may continue on to block 725 to include receiving substantially none of the incident radiation at a blind detector of the pair of radiation detectors to provide a second signal proportional to the reception of substantially no incident radiation. The activity at block 725, to include receiving substantially none of the incident radiation at the blind detector, may further comprise receiving substantially none of the incident radiation at the blind detector comprising one of a permanently blind detector or a shuttered, periodically blind detector.

The method 711 may continue on to block 729 with compensating other detectors, in addition to the active detector of a single dual-detector pair. Thus, the activity at block 729 may comprise compensating an array of detectors, including the pair of radiation detectors, by acquiring a signal provided by at least one additional detector in the array operating as a blind detector. The activity at block 729 may also comprise compensating an array of detectors using multiple blind detectors, including the blind detector. Other ways of compensating detectors in an array of detectors, to include averaging the outputs of multiple dual-detector pairs, are also contemplated.

The method 711 may continue on to block 733 with combining the first signal and the second signal to provide an output signal representing the difference between the first signal and the second signal. This output single comprises an output signal compensated for temperature when the active detector and the blind detector in the pair share ambient temperature changes (e.g., they are attached in close proximity, such as being separated from each other by less than about one to five times the longest dimension of one of the detectors on the same supporting surface, including a substrate).

The method 711 may continue on to block 737 to comprise automatically adjusting the gain of an amplifier electrically coupled to the active detector and the blind detector to provide a desired signal to noise ratio of the output signal. In some embodiments, the method 711 may continue on to block 741 to include digitizing the output signal to provide a digitized output signal.

In some embodiments, the method 711 may include comparing signals between the detectors at block 743, such as when the detectors are operated as an alternately active-blind pair (e.g., detector A is active when detector B is shuttered, and detector B is active when detector A is shuttered). Thus, the activity at block 743 may comprise alternately shuttering the pair of detectors; and comparing the output signal when a first one of the pair of radiation detectors is shuttered, with the output signal when a second one of the pair of radiation detectors is shuttered.

If the detectors are being used to analyze fluid samples, then the method 711 may continue on to block 745 to determine whether more samples are to be taken. If so, then the method 711 may return to block 721. Otherwise, the method 711 may continue on to block 749 with storing the digitized output signal and/or transmitting the digitized output signal to a surface logging facility.

It should be noted that the methods described herein do not have to be executed in the order described, or in any particular order. Moreover, various activities described with respect to the methods identified herein can be executed in iterative, serial, or parallel fashion. Some activities may be added, and some of the included activities may be left out. Information, including parameters, commands, operands, and other data, can be sent and received in the form of one or more carrier waves.

Figure 8:
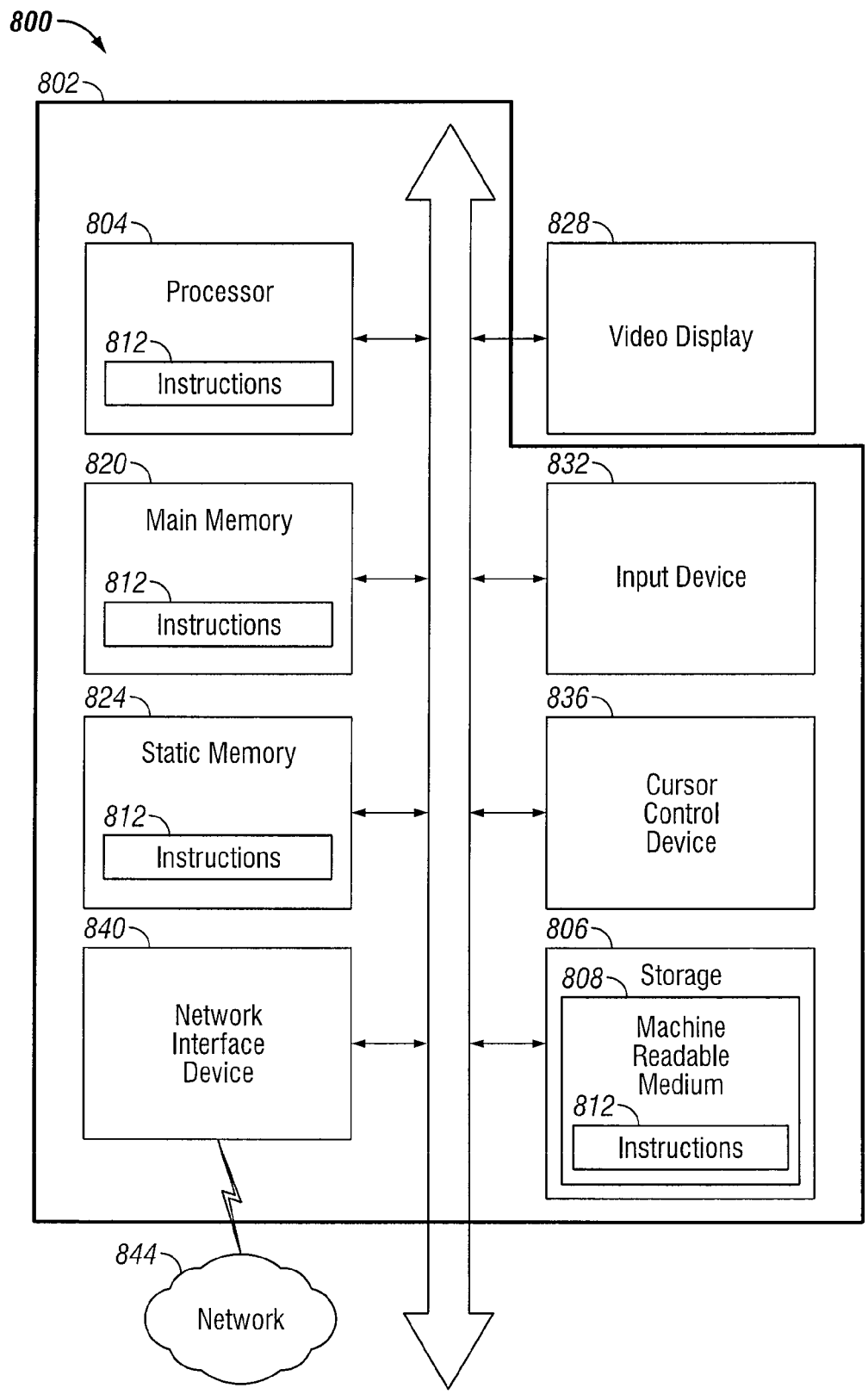
FIG. 8 is a block diagram of an article according to various embodiments of the invention.

FIG. 8 is a block diagram of an article 800 of manufacture, including a specific machine 802, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 800 of manufacture, such as a computer, a memory system, a magnetic or optical disk, some other storage device, and/or any type of electronic device or system may include one or more processors 804 coupled to a machine-readable medium 808 such as a memory (e.g., removable storage media, as well as any memory including an electrical, optical, or electromagnetic conductor comprising tangible media) having instructions 812 stored thereon (e.g., computer program instructions), which when executed by the one or more processors 804 result in the machine 802 performing any of the actions described with respect to the methods above.

The machine 802 may take the form of a specific computer system having a processor 804 coupled to a number of components directly, and/or using a bus 816. Thus, the machine 802 may be similar to or identical to the workstation 392 shown in FIGS. 5 and 6, or the acquisition and processing electronics 434 in the apparatus 400 of FIG. 4.

Turning now to FIG. 8, it can be seen that the components of the machine 802 may include main memory 820, static or non-volatile memory 824, and mass storage 806. Other components coupled to the processor 804 may include an input device 832, such as a keyboard, or a cursor control device 836, such as a mouse. An output device 828, such as a video display, may be located apart from the machine 802 (as shown), or made as an integral part of the machine 802.

A network interface device 840 to couple the processor 804 and other components to a network 844 may also be coupled to the bus 816. The instructions 812 may be transmitted or received over the network 844 via the network interface device 840 utilizing any one of a number of well-known transfer protocols (e.g., HyperText Transfer Protocol). Any of these elements coupled to the bus 816 may be absent, present singly, or present in plural numbers, depending on the specific embodiment to be realized.

The processor 804, the memories 820, 824, and the storage device 806 may each include instructions 812 which, when executed, cause the machine 802 to perform any one or more of the methods described herein. In some embodiments, the machine 802 operates as a standalone device or may be connected (e.g., networked) to other machines. In a networked environment, the machine 802 may operate in the capacity of a server or a client machine in server-client network environment, or as a peer machine in a peer-to-peer (or distributed) network environment.

The machine 802 may comprise a personal computer (PC), a workstation, a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 802 is illustrated, the term "machine" shall also be taken to include any collection of machines that individually or jointly execute a set (or multiple sets) of instructions to perform any one or more of the methodologies discussed herein.

While the machine-readable medium 808 is shown as a single medium, the term "machine-readable medium" should be taken to include a single medium or multiple media (e.g., a centralized or distributed database, and/or associated caches and servers, and or a variety of storage media, such as the registers of the processor 804, memories 820, 824, and the storage device 806 that store the one or more sets of instructions 812. The term "machine-readable medium" shall also be taken to include any medium that is capable of storing, encoding or carrying a set of instructions for execution by the machine and that cause the machine 802 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Using the apparatus, systems, and methods disclosed, those in the petroleum recovery industry and other industries may now be able to more accurately assess the composition of fluid samples while accommodating a wide dynamic range in signal intensity. In addition, a single detection scheme may be used in some embodiments, where one detector pair operates over a wide range of wavelengths (e.g., about 300 nm to about 5000 nm). Increased operational efficiency and client satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description and the figures, with each claim standing on its own as a separate embodiment.

What is claimed is:

1. An apparatus, comprising:
   at least one pair of radiation detectors configured as a set of periodically-blind detectors that alternate between active and blind operation; and
   at least one amplifier to receive a pair of signals from the pair of detectors, and to transform the pair of signals into an output signal representing the difference between a signal proportional to radiation received by a blind one of the pair of detectors and a signal proportional to radiation received by an active one of the pair of detectors.

2. The apparatus of claim 1, wherein the pair of radiation detectors are attached to the same supporting surface.

3. The apparatus of claim 1, further comprising:
   an array of detectors, including the at least one pair of radiation detectors, wherein at least one additional detector in the array comprises a periodically blind detector or a permanently blind detector.

4. The apparatus of claim 1, wherein the at least one amplifier comprises a differential amplifier, and wherein the pair of radiation detectors comprise thermopile detectors.

5. A system, comprising:
   a downhole tool;
   at least one pair of radiation detectors configured as a set of periodically-blind detectors that alternate between active and blind operation; and
   at least one amplifier to receive a pair of signals from the pair of detectors, and to transform the pair of signals into an output signal representing the difference between a signal proportional to radiation received by a blind one of the pair of detectors and a signal proportional to radiation received by an active one of the pair of detectors, the at least one pair of radiation detectors and the at least one amplifier at least partially housed by the downhole tool.

6. The system of claim 5, wherein the downhole tool comprises one of a wireline tool or a measurement while drilling tool.

7. The system of claim 5, further comprising:
   a telemetry transmitter to communicate values associated with the output signal to a surface logging facility.

8. The system of claim 5, further comprising:
   a signal processor to receive and digitize the output signal as a digitized output signal.

9. The system of claim 5, further comprising:
   a source of the radiation to be received by the active one of the pair of detectors; and
   a flow cell to receive a fluid sample and to permit passage of the radiation received by the active one of the pair of detectors through the fluid sample.

10. A processor-implemented method to execute on one or more processors that perform the method, comprising:
    receiving incident radiation at an active detector of a pair of alternately shuttered radiation detectors to provide a first signal proportional to an intensity of the incident radiation;
    receiving substantially none of the incident radiation at a blind detector of the pair of alternately shuttered radiation detectors to provide a second signal proportional to the reception of substantially no incident radiation; and
    combining the first signal and the second signal to provide an output signal representing the difference between the first signal and the second signal.

11. The method of claim 10, wherein receiving the incident radiation at the active detector comprises:
    receiving the incident radiation at the active detector comprising one of an array of alternately shuttered, radiation detector pairs.

12. The method of claim 10, wherein receiving the incident radiation at the active detector comprises:
    receiving the incident radiation at the active detector after the incident radiation has passed through a flow cell.

13. The method of claim 10, wherein receiving the incident radiation at the active detector comprises:
    receiving the incident radiation at the active detector after the incident radiation has passed through a spectral distributor.

14. The method of claim 10, further comprising:
    receiving substantially none of the incident radiation at the another detector comprising a permanently blind detector.

15. The method of claim 10, further comprising:
    automatically adjusting a gain of an amplifier electrically coupled to the active detector and the blind detector to provide a desired signal to noise ratio of the output signal.

16. The method of claim 10, further comprising:
digitizing the output signal to provide a digitized output signal; and
at least one of storing the digitized output signal or transmitting the digitized output signal to a surface logging facility.

17. The method of claim 10, further comprising:
compensating an array of detectors, including the pair of radiation detectors, by acquiring a signal provided by at least one additional detector in the array operating as a blind detector.

18. An article including a non-transitory machine-readable medium having instructions stored therein, wherein the instructions, when executed, result in a machine performing:
receiving incident radiation at an active detector of a pair of alternately shuttered thermopile radiation detectors to provide a first signal proportional to an intensity of the incident radiation;
receiving substantially none of the incident radiation at a blind detector of the pair of alternately shuttered thermopile radiation detectors to provide a second signal proportional to the reception of substantially no incident radiation; and
combining, using differential amplification, the first signal and the second signal to provide an output signal representing the difference between the first signal and the second signal.

19. The article of claim 18, wherein the instructions, when executed, result in the machine performing:
compensating an array of detectors using multiple blind detectors, including the blind detector.

20. The article of claim 18, wherein the instructions, when executed, result in the machine performing:
alternately shuttering the pair of thermopile radiation detectors; and
comparing the output signal when a first one of the pair of thermopile radiation detectors is shuttered with the output signal when a second one of the pair of thermopile radiation detectors is shuttered.

* * * * *